(12) United States Patent
Imagawa

(10) Patent No.: US 10,613,826 B2
(45) Date of Patent: Apr. 7, 2020

(54) HEAD-MOUNTED DISPLAY SYSTEM AND OPERATING METHOD FOR HEAD-MOUNTED DISPLAY DEVICE

(71) Applicant: MAXELL, LTD., Kyoto (JP)

(72) Inventor: Seiji Imagawa, Tokyo (JP)

(73) Assignee: MAXELL, LTD., Kyoto (JP)

( * ) Notice: Subject to any disclaimer, the term of this patent is extended or adjusted under 35 U.S.C. 154(b) by 90 days.

(21) Appl. No.: 15/538,830

(22) PCT Filed: Dec. 25, 2014

(86) PCT No.: PCT/JP2014/084372
§ 371 (c)(1),
(2) Date: Jun. 22, 2017

(87) PCT Pub. No.: WO2016/103415
PCT Pub. Date: Jun. 30, 2016

(65) Prior Publication Data
US 2018/0011687 A1 Jan. 11, 2018

(51) Int. Cl.
*G06F 3/16* (2006.01)
*G06F 21/84* (2013.01)
(Continued)

(52) U.S. Cl.
CPC ............ *G06F 3/167* (2013.01); *G06F 17/289* (2013.01); *G06F 17/2863* (2013.01);
(Continued)

(58) Field of Classification Search
CPC .... G06F 3/167; G06F 3/0482; G06F 3/04842; G06F 2203/0381; G06F 3/0484;
(Continued)

(56) References Cited

U.S. PATENT DOCUMENTS

| 6,415,258 B1 * | 7/2002 | Reynar | G06F 3/167 704/275 |
| 7,552,053 B2 * | 6/2009 | Gao | G06F 17/2827 704/258 |

(Continued)

FOREIGN PATENT DOCUMENTS

| JP | H09-081184 A | 3/1997 |
| JP | H10-020883 A | 1/1998 |

(Continued)

OTHER PUBLICATIONS

International Search Report for WO 2016/103415 A1, dated Mar. 3, 2015.

*Primary Examiner* — Abdelali Serrou
(74) *Attorney, Agent, or Firm* — Volpe and Koenig, P.C.

(57) ABSTRACT

Operability of head-mounted display systems is enhanced by incorporating the following: a microphone which receives an utterance input by a person and outputs voice information; a character string generation unit which generates an uttered character string by converting the voice information into a character string; a specific utterance information storage unit which stores specific utterance information that associates at least one program to be started or stopped and/or at least one operating mode to be started or stopped, with specific utterances for starting or stopping each of the programs and/or operating modes; a specific utterance extraction unit which extracts a specific utterance included in the uttered character string with reference to the specific utterance information, and generates an extracted specific utterance signal indicating the extraction result; and a control unit which starts or stops a program or an operating mode with reference to the extracted specific utterance signal.

15 Claims, 11 Drawing Sheets

| TYPE OF LANGUAGE | COMPREHENSION ABILITY | SPEECH ABILITY |
|---|---|---|
| JAPANESE | FIRST LANGUAGE | FIRST LANGUAGE |
| ENGLISH | SECOND LANGUAGE | FOURTH LANGUAGE |
| CHINESE | THIRD LANGUAGE | FIFTH LANGUAGE |

(51) Int. Cl.
  *G06F 21/32* (2013.01)
  *G06F 17/28* (2006.01)
  *G10L 15/22* (2006.01)
  *G10L 15/26* (2006.01)

(52) U.S. Cl.
  CPC .............. *G06F 21/32* (2013.01); *G06F 21/84* (2013.01); *G10L 15/22* (2013.01); *G10L 15/265* (2013.01); *G10L 2015/223* (2013.01)

(58) Field of Classification Search
  CPC ........ G06F 21/84; G06F 21/32; G06F 17/289; G06F 17/2863; G06F 9/451; G06F 9/454; G06F 17/2217; G06F 17/28; G06F 16/9535; G06F 17/2854; G06F 3/04883; G10L 15/22; G10L 2015/223; G10L 15/30; G10L 2015/225; G10L 2015/228; G10L 21/06; G10L 15/1815; G10L 15/19; G10L 2015/0638; G10L 2015/088; G10L 13/00; G10L 15/06; G10L 15/075; G10L 15/20; G10L 15/26; G10L 15/265; G10L 15/32; G10L 2015/221; G10L 2021/105
  See application file for complete search history.

(56) References Cited

U.S. PATENT DOCUMENTS

| | | | | |
|---|---|---|---|---|
| 8,543,834 | B1* | 9/2013 | Barra | G06F 21/32 713/182 |
| 8,650,036 | B2* | 2/2014 | Han | G10L 15/22 704/275 |
| 8,814,691 | B2* | 8/2014 | Haddick | G02B 27/017 463/42 |
| 9,111,538 | B2* | 8/2015 | Lau | G10L 15/22 |
| 9,262,405 | B1* | 2/2016 | Baliga | G06Q 30/0255 |
| 9,489,985 | B2* | 11/2016 | Machida | G06F 3/0481 |
| 9,541,996 | B1* | 1/2017 | Baxter | G06F 3/012 |
| 2004/0207658 | A1* | 10/2004 | Awada | G06F 9/451 715/747 |
| 2008/0082316 | A1* | 4/2008 | Tsui | G09B 5/00 704/4 |
| 2008/0235027 | A1* | 9/2008 | Cross | G10L 15/22 704/270.1 |
| 2010/0031141 | A1* | 2/2010 | Summers | G06F 17/30926 715/239 |
| 2011/0279635 | A1* | 11/2011 | Periyannan | H04N 7/141 348/14.09 |
| 2012/0059644 | A1* | 3/2012 | Sata | G06F 17/289 704/3 |
| 2012/0253785 | A1* | 10/2012 | Hamid | G06F 17/2229 704/4 |
| 2012/0310622 | A1* | 12/2012 | Zivkovic | G06F 17/289 704/3 |
| 2013/0325484 | A1* | 12/2013 | Chakladar | G06F 3/167 704/275 |
| 2014/0099082 | A1* | 4/2014 | Miller | H04N 5/93 386/285 |
| 2014/0297254 | A1 | 10/2014 | Yeo et al. | |
| 2015/0194155 | A1* | 7/2015 | Tsujikawa | G10L 17/00 704/246 |
| 2015/0199908 | A1* | 7/2015 | Smith | G09B 5/00 434/157 |
| 2015/0363757 | A1* | 12/2015 | Mocko | G06Q 20/20 705/16 |
| 2016/0036740 | A1* | 2/2016 | Barber | H04L 51/063 704/3 |

FOREIGN PATENT DOCUMENTS

| | | |
|---|---|---|
| JP | 2002-507298 A | 3/2002 |
| JP | 2002-244842 A | 8/2002 |
| JP | 2005-031150 A | 2/2005 |
| JP | 2005-222316 A | 8/2005 |
| JP | 2007-280163 A | 10/2007 |
| JP | 2014-164537 A | 9/2014 |
| JP | 2014-203454 A | 10/2014 |

* cited by examiner

FIG.5

| TARGET NAME | ACTIVATION SPECIFIC SPEECH | SHUTDOWN SPECIFIC SPEECH | EXCLUSIVE CONTROL |
|---|---|---|---|
| AR | START AR | SHUT DOWN AR | NO |
| DRIVE ASSIST | START UP DRIVE ASSIST | STOP DRIVE ASSIST | YES |
| | START | STOP SPECIFIC SPEECH | |
| TRANSLATION PROGRAM | Hello | bye | NO |
| | HELLO | BYE BYE | |

| TYPE OF LANGUAGE | COMPREHENSION ABILITY | SPEECH ABILITY |
|---|---|---|
| JAPANESE | FIRST LANGUAGE | FIRST LANGUAGE |
| ENGLISH | SECOND LANGUAGE | FOURTH LANGUAGE |
| CHINESE | THIRD LANGUAGE | FIFTH LANGUAGE |

HEAD-MOUNTED DISPLAY SYSTEM AND OPERATING METHOD FOR HEAD-MOUNTED DISPLAY DEVICE

TECHNICAL FIELD

The present invention relates to an operation technique of a head-mounted display device (hereinafter abbreviated as "HMD device").

BACKGROUND ART

As a background technique in this technical field, Patent Literature 1 discloses "an electronic dictionary including: a camera capable of capturing an image of a character string consisting of words or sentences within the field of view of an eyeglass unit and a control unit for outputting an image signal of the character string captured by the camera to a translation unit via a signal transmission line, wherein the translation unit includes an OCR that performs character-recognition of the image signal of the character string that is output from the control unit of the eyeglass unit and a control unit for translating the character string recognized by the OCR and outputting a translation result to the eyeglass unit via a signal transmission line, and a display element of the eyeglass unit is configured to display the translation result on a display unit (abstract excerpt)".

Patent Literature 2 describes a system which displays an answer to a speech content of another person, and discloses "a conversation support system for supporting conversation between a user and another person, including: an original language expression input unit that inputs an original language expression including a natural language sentence in a first language spoken by the user, an original language conversion unit for converting the original language expression into another expression in a second language, an answer screen generation unit for generating an answer screen in which another person answers to the another expression, and a display unit for displaying, on the same screen, the original language expression, the another expression, and the answer screen (abstract excerpt)".

CITATION LIST

Patent Literature

PATENT LITERATURE 1: JP-2007-280163A
PATENT LITERATURE 2: JP-2005-222316A

SUMMARY OF INVENTION

Technical Problem

As compared with a smartphone and an electronic dictionary, an HMD device used as a different language translator or a conversation support device does not require a user to hold the HMD device. Therefore, the HMD device is an advantage in that the HMD device can easily fit in everyday life, for example, at the outside of the house or in a situation where the user is holding luggage.

Speaking Partner

However, it is necessary for the user himself to start up the system using the HMD device or change the operation mode. Therefore, when both hands are occupied, operability is still not good. This point is not considered in Patent Literature 1 and Patent Literature 2.

The present invention has been made in view of the above circumstances, and it is an object of the present invention to provide a technique capable of further improving the operability of a system using an HMD device.

Solution to Problem

In order to solve the above problem, the present invention is characterized in including receiving an input of speech of a speaking person and outputting sound information, converting the sound information into a character string and generating a speech character string, extracting the specific speech included in the speech character string by referring to specific speech information in which at least one of a program and an operation mode, which is to be started up or shut down, is associated with a specific speech for starting up or shutting down the program and the operation mode, and generating a specific speech extraction signal indicating an extraction result thereof, and a step of starting up or shutting down the program or the operation mode by referring to the specific speech extraction signal.

Advantageous Effects of Invention

According to the present invention, a technique capable of further improving the operability of the system using the HMD device can be provided. The problems, configurations, and effects other than those described above will be understood from the description of the embodiments below.

BRIEF DESCRIPTION OF DRAWINGS

FIG. 5 is a diagram showing an example of a specific speech information table.

DESCRIPTION OF EMBODIMENTS

Figure 1:
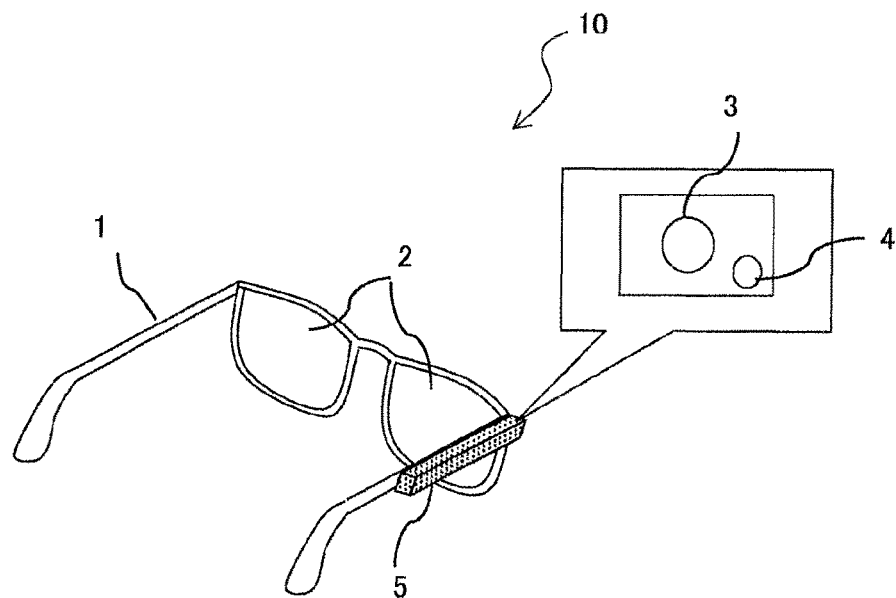
FIG. 1 is a perspective view showing an overview of an example of an external configuration of an HMD device equipped with a startup/shutdown program according to the present embodiment.

Hereinafter, embodiments of the present invention will be described with reference to the drawings. Throughout the drawings, the same configurations are denoted by the same reference numerals, and redundant description is omitted.

First Embodiment

Figure 2:
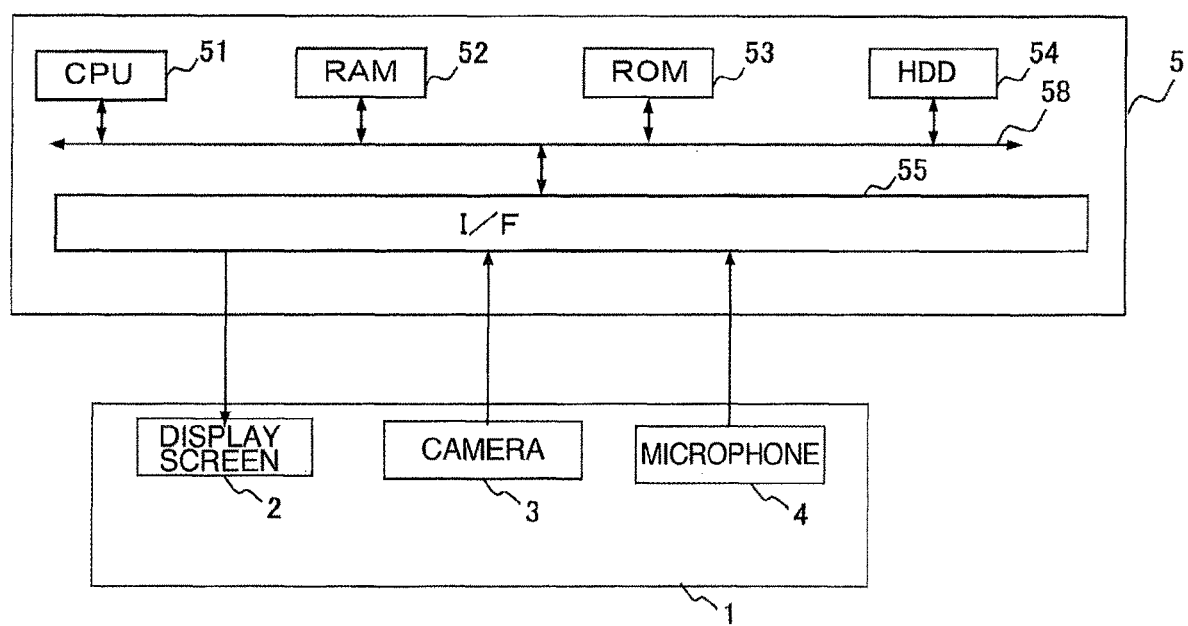
FIG. 2 is a diagram showing a hardware configuration of the HMD device.

The first embodiment is an embodiment in which a program and an operation mode executed by an HMD device is started up and shut down on the basis of speech. First, a schematic configuration of the HMD system will be described with reference to FIG. 1 to FIG. 2. In this case, FIG. 1 is a perspective view showing an overview of an example of an external configuration of the HMD device equipped with the startup and shutdown program according to the present embodiment. FIG. 2 is a diagram showing a hardware configuration of the HMD device.

In the HMD system 10 shown in FIG. 1, the HMD device 1 and the application control device 5 are integrally configured. The HMD device 1 includes an attachment body (main body unit) 1a for maintaining the HMD device 1 attached to the head of the user of the HMD device 1, a transflective display screen 2 (having transparency) with the function of displaying images within the field of view of the user, a camera 3 for imaging the surrounding situation (in specific, a person with whom the user speaks) with substantially the same line of sight as the user, a microphone 4 collecting speech spoken by the user and a person with whom the user speaks (both of which will be hereinafter referred to as "speaking person") and outputting sound information, and an application control device 5 starting up and shutting down an operation mode and an application program including display processing on the display screen 2 on the basis of inputs of the image information and the sound information.

In this first embodiment, the attachment body 1a is composed of a frame of glasses and the display screen 2 is placed in the frame and positioned before the eyes of the user. The application control device 5 is attached to the frame of the glasses. The camera 3 and microphone 4 are placed at the front of the application control device 5.

In the present embodiment, the application control device 5 is configured integrally with the attachment body 1a, but the application control device 5 may be configured separately from the attachment body 1a and may be wired via a communication cable, or, for example, Bluetooth (registered trademark) may be used for wireless connection. When the application control device 5 is configured integrally with the attachment body 1a, the HMD device 1 can be easily handled, and when the application control device 5 and the attachment body 1a are configured separately, this eliminates the limitation of making the application control device 5 into such a size that can be attached to the frame, and the flexibility in design can be improved. In specific, when the present invention is applied to the translation system described in the second embodiment, a storage device for storing various kinds of dictionaries is necessary, the size of the application control device 5 tends to increase, and the separate configuration is preferred in this embodiment.

The hardware configuration of the application control device 5 according to the present embodiment will be described with reference to FIG. 2. FIG. 2 is a diagram showing the hardware configuration of the application control device 5.

As illustrated in FIG. 2, the application control device 5 includes a CPU (Central Processing Unit) 51, a RAM (Random Access Memory) 52, a ROM (Read Only Memory) 53, an HDD (Hard Disk Drive) 54, an I/F 55, and a bus 58. The CPU 51, the RAM 52, the ROM 53, the HDD 54, and the I/F 55 are configured to be connected with each other via a bus 58. As long as the ROM (Read Only Memory) 53 and the HDD (Hard Disk Drive) 54 are storage media capable of storing programs, the ROM (Read Only Memory) 53 and the HDD (Hard Disk Drive) 54 may be of any type, and for example, the ROM (Read Only Memory) 53 and the HDD (Hard Disk Drive) 54 may be replaced with any medium such as an SSD (Solid State Drive) that can be easily reduce the size of the application control device 5.

The application control device 5 is connected to the HMD device 1 including the display screen 2, the camera 3, and the microphone 4 via the I/F 55. On display screen 2, a video output signal is output from the application control device 5. The camera 3 outputs a captured image that is captured with nearly the same line of sight as the user to the application control device 5. The microphone 4 collects sounds around the user, but the microphone 4 may have directivity so that it has a higher sensitivity to the sound in front of the user.

Figure 3:
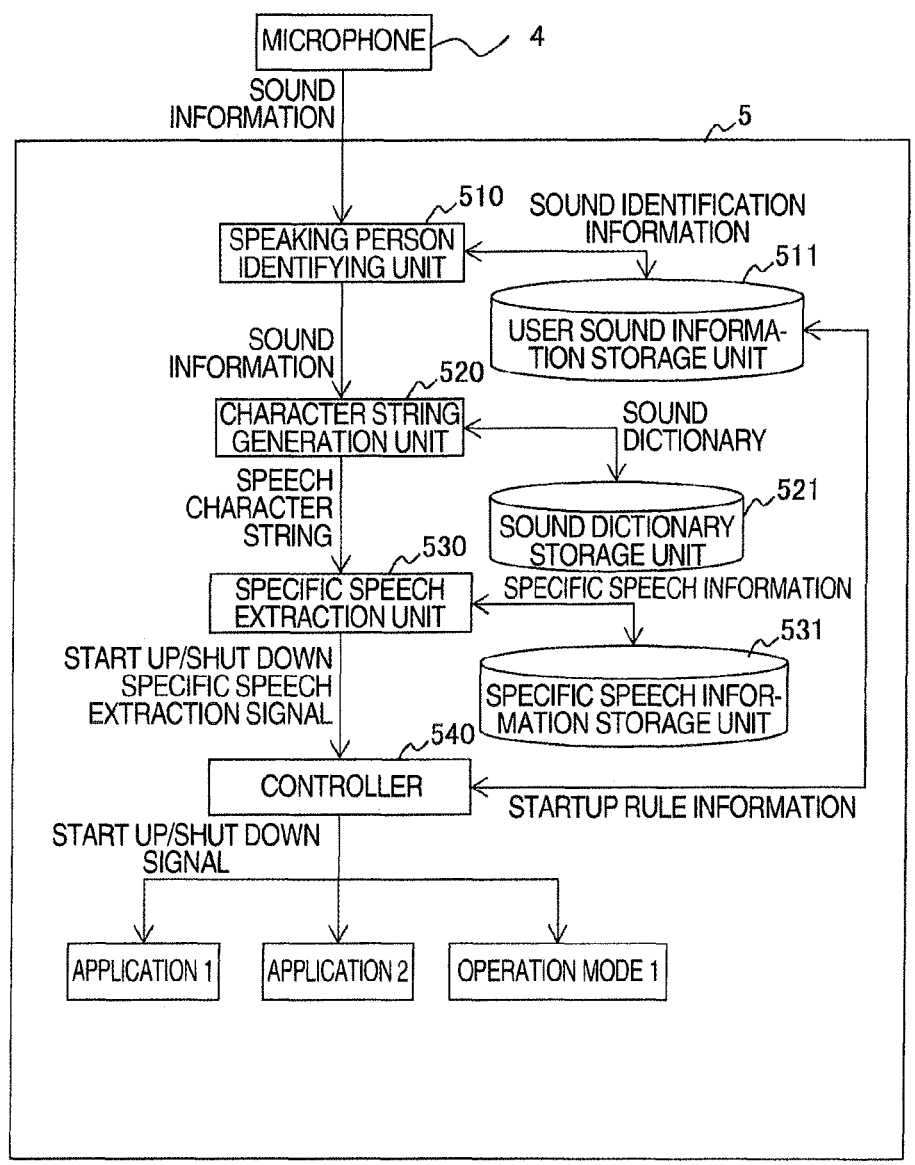
FIG. 3 is a block diagram showing the functional configuration of an application control device.

The functional configuration of the application control device 5 will be described with reference to FIG. 3. FIG. 3 is a block diagram showing the functional configuration of the application control device 5.

As illustrated in FIG. 3, the application control device 5 includes a speaking person identifying unit 510, a character string generation unit 520, a specific speech extraction unit 530, a controller 540, an application program (hereinafter referred to as an "application") 1, an application 2, and an application 3. Each of the speaking person identifying unit 510, the character string generation unit 520, the specific speech extraction unit 530, and the controller 540 is constituted by cooperation of software for realizing each configuration and hardware for executing this software. The details of the function of each block will be described in detail with reference to a flowchart.

Further, the application control device 5 includes a user sound information storage unit 511, a sound dictionary storage unit 521, and a specific speech information storage unit 531.

The user sound information storage unit 511 stores sound identification information of the user that is referred to when the user of the HMD device 1 is identified.

The sound dictionary storage unit 521 stores a sound dictionary in which sound information and phonograms or ideograms are associated with each other.

The specific speech information storage unit 531 stores a program to be started up, at least one of the operation modes (for example, the application 1, the application 2, and the operation mode 1), and these programs, and specific speech information associated with a specific speech for starting up and shutting down the operation mode. In the present embodiment, the level of priority for starting up each program or the operation mode is also defined in the specific speech information. Therefore, in the present embodiment, the specific speech information also includes startup rule information, and the specific speech information storage unit 531 also functions as a startup rule information storage unit.

Subsequently, the relationship of each block will be described. The microphone 4 outputs sound information generated by collecting speech of the user or the person with whom the user speaks to the speaking person identifying unit 510. The character string generation unit 520 converts the sound information and generates a character string (hereinafter referred to as "speaking person character string") composed of phonetic characters, and outputs the speaking person character string to the specific speech extraction unit 530. The specific speech extraction unit 530 performs extraction processing of specific speech to start up and shut down the program or the operation mode. The specific speech extraction unit 530 generates a startup specific speech extraction signal indicating the result when a specific speech for startup is extracted. The specific speech extraction unit 530 generates a shutdown specific speech extraction signal indicating the result when a specific speech for shutdown is extracted.

The specific speech extraction unit 530 outputs the startup specific speech extraction signal and the shutdown specific speech extraction signal to a controller 540 (corresponding to control unit). In accordance with the startup specific speech extraction signal and the shutdown specific speech extraction signal, the controller 540 outputs a startup signal for starting up the program or the operation mode, or a shutdown signal for shutdown.

Figure 4:
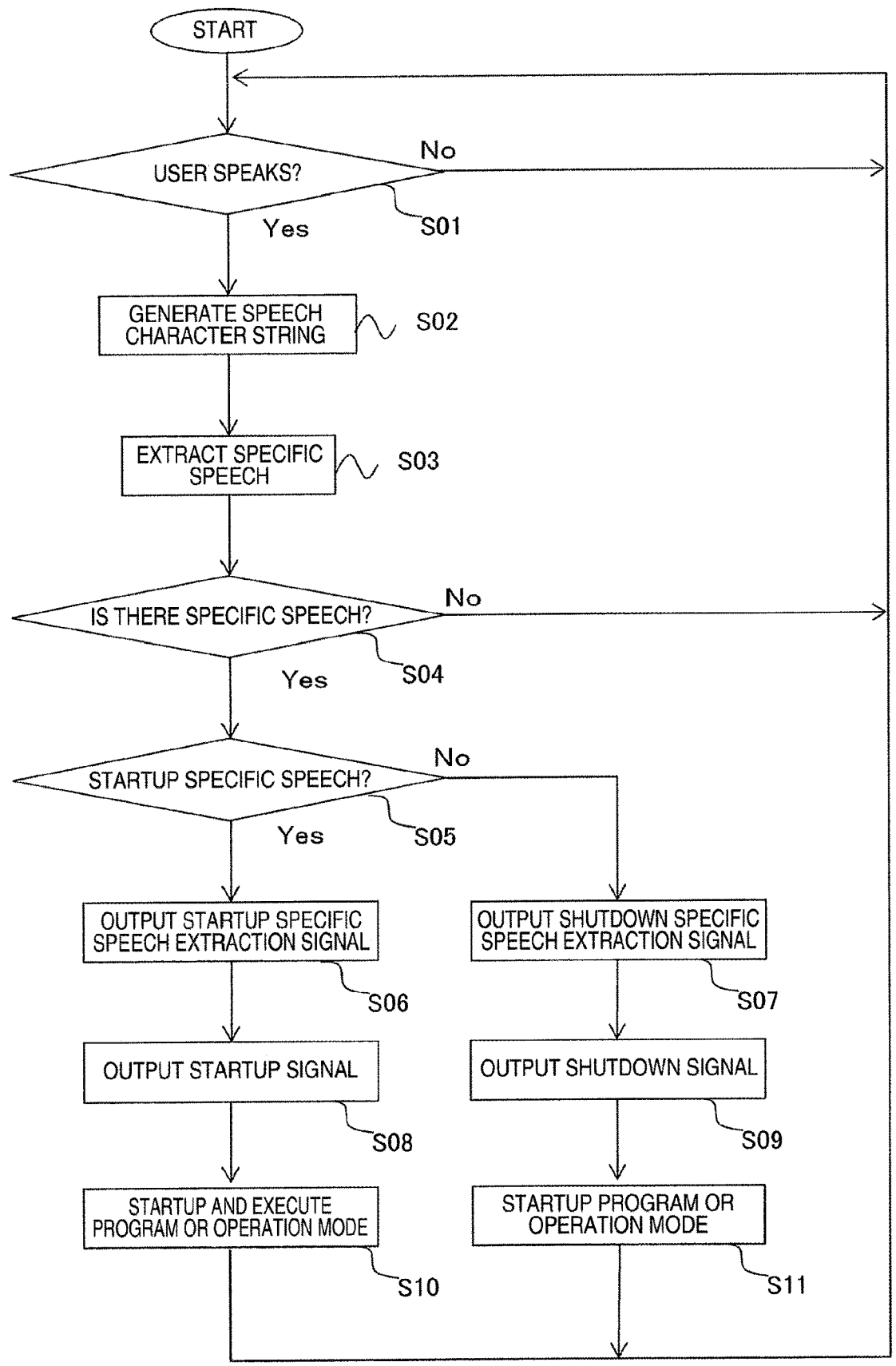
FIG. 4 is a flowchart showing a flow of startup and shutdown processing (operating method) of the HMD device according to the present embodiment

Subsequently, the flow of startup and shutdown processing of the HMD device 1 according to the present embodiment will be described with reference to FIG. 4 to FIG. 5. FIG. 4 is a flowchart showing the flow of startup and shutdown processing of the HMD device 1 according to the present embodiment. FIG. 5 shows an example of a specific speech information table.

The microphone 4 collects speech to generate sound information, and the speaking person identifying unit 510 determines whether the speaking person is the user or not (S01). When the speaking person is determined not to be the user (S01/No), the speaking person identifying unit 510 repeats the identification processing of the speaking person without outputting the sound information to the character string generation unit 520. When the speaking person is determined to be the user (S01/Yes), the speaking person identifying unit 510 outputs the sound information to the character string generation unit 520.

The speaking person identifying unit 510 obtains sound information from the microphone 4, and for example, performs fast Fourier transform processing on the sound information. Whether the speaking person is the user or not is determined based on consistency between the obtained frequency analysis result and the sound identification information stored in the user sound information storage unit 511, or consistency between voiceprint of the sound information and voiceprint of the sound identification information.

The character string generation unit 520 converts sound information into a speech character string (S02) and outputs it to the specific speech extraction unit 530. The character string generation unit 520 refers to the sound dictionary, and converts the sound information sent from the microphone 4 into a speech character string composed of phonograms.

The specific speech extraction unit 530 extracts a specific speech based on the consistency between the speech character string and the specific speech information stored in the specific speech information storage unit 531 (S03).

In this case, the specific speech is speech associated with each of the startup operation and the shutdown operation of each program. As illustrated in FIG. 5, the specific speech information is data defined by associating the program name on which startup or shutdown operation is performed, startup specific speech for starting up the program, and shutdown specific speech for shutting down the program. Further in the present embodiment, even when a startup specific speech of another program is extracted while any given program is started up, activation or deactivation of a so-called exclusive control for not starting up the another program is also defined in the specific speech information. In FIG. 5, the drive assist program is defined as an exclusive control "activated". Therefore, while the drive assist program is executed, not only the another program is prevented from being started up but also another program, which is being started up, is forcibly terminated when the startup specific speech of the drive assist program is detected during execution of the another program, so that only the drive assist is executed. Therefore, during execution of the drive assist program, an AR (Augmented Reality) program and a translation program are not executed so that this prevents problems so that augmented display or character strings which are not related to driving, which disturbs the visibility, are not displayed in the driver's visual field.

In the above example, although the program is explained as an example, but in the case where multiple operation modes are included in one program, specific speech may be specified for each operation mode. Furthermore, instead of exclusive control, the level of priority may be set in a plurality of levels, and the programs or the operation mode which are to be started up or shut down may be arranged into levels.

When a specific speech is extracted (S04/YES) and the specific speech is a startup specific speech for starting up the program or the operation mode (S05/Yes), a startup specific speech extraction signal indicating that a specific speech serving as a trigger of startup is detected is output to the controller 540 (S06). When a specific speech is extracted (S04/YES) and the specific speech is not a specific speech for shutting down the program or the operation mode (S05/No), a shutdown specific speech extraction signal indicating that a specific speech which serves as a trigger for shutdown has been detected is output to the controller 540 (S07). If a specific speech is not extracted (S04/No), step S01 is performed again to repeat the repeat processing. Since the startup specific speech extraction signal and the shutdown specific speech extraction signal are information indicating for which program a specific speech for startup or shutdown is detected, the controller 540 can determine the program and the operation mode to startup and shutdown by referring to the signals.

When the controller 540 receives the startup specific speech extraction signal and the shutdown specific speech extraction signal, the controller 540 outputs a startup signal (S08) or a shutdown signal (S09) to the program or the operation mode which is to be started up or shut down in the startup or shutdown operation. As a result, the target program or operation mode starts up (S10) or shuts down (S11).

According to the present embodiment, the user has only to speak in order to start up and shutdown the program or the operation mode to be executed with the HMD device 1, so that the operability is improved. When a specific speech is extracted, the startup and shutdown processing is executed after identifying whether the specific speech is spoken by the user, and therefore, even if a startup specific speech or a shutdown specific speech is included in the speech of a person other than the user, this can prevent execution of the startup and shutdown operation of the program or the operation mode that is not intended by the user.

Second Embodiment

Figure 6:
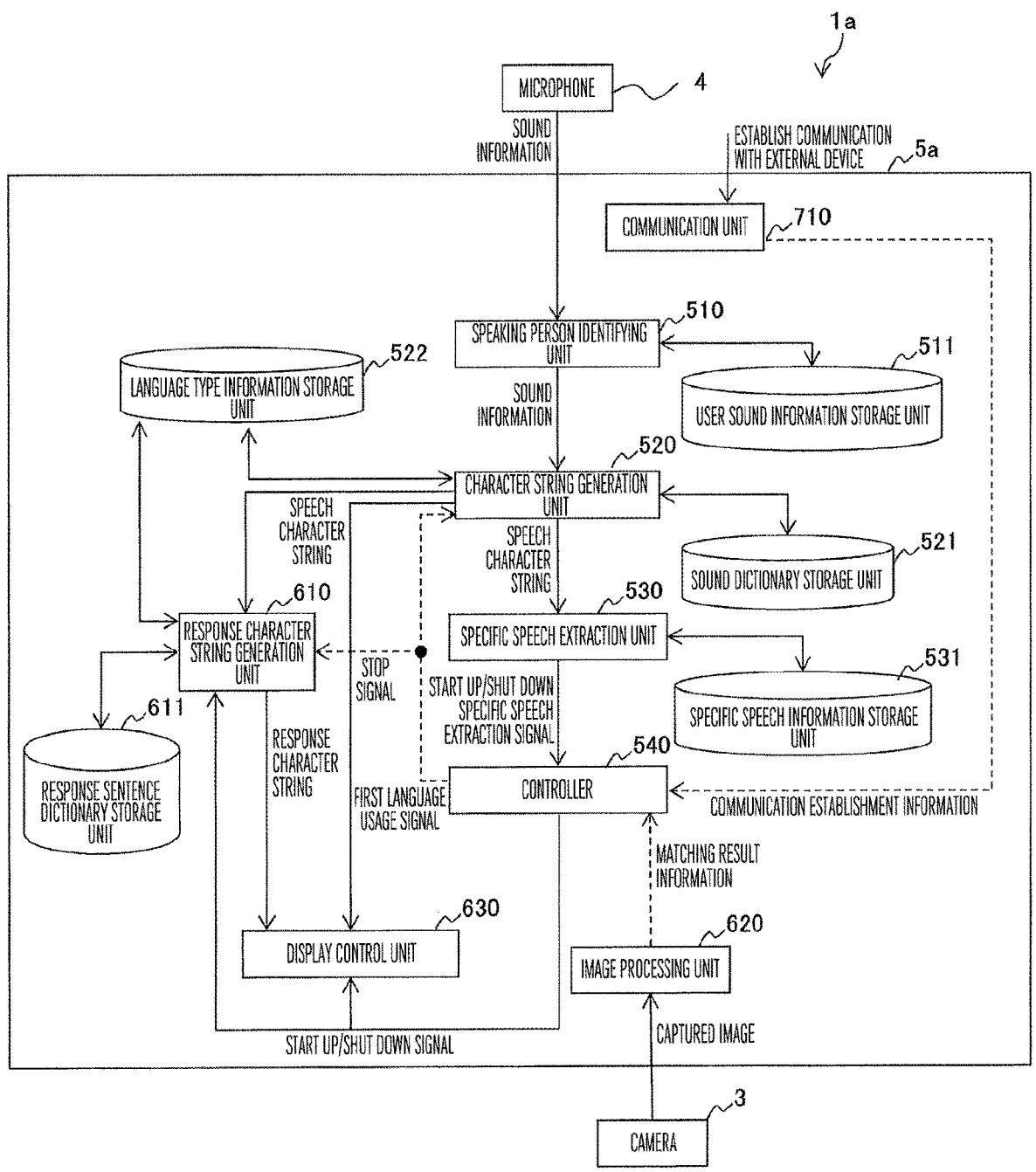
FIG. 6 is a block diagram showing a functional configuration of a control device of a translation program according to a second embodiment
Figures 7, 8:
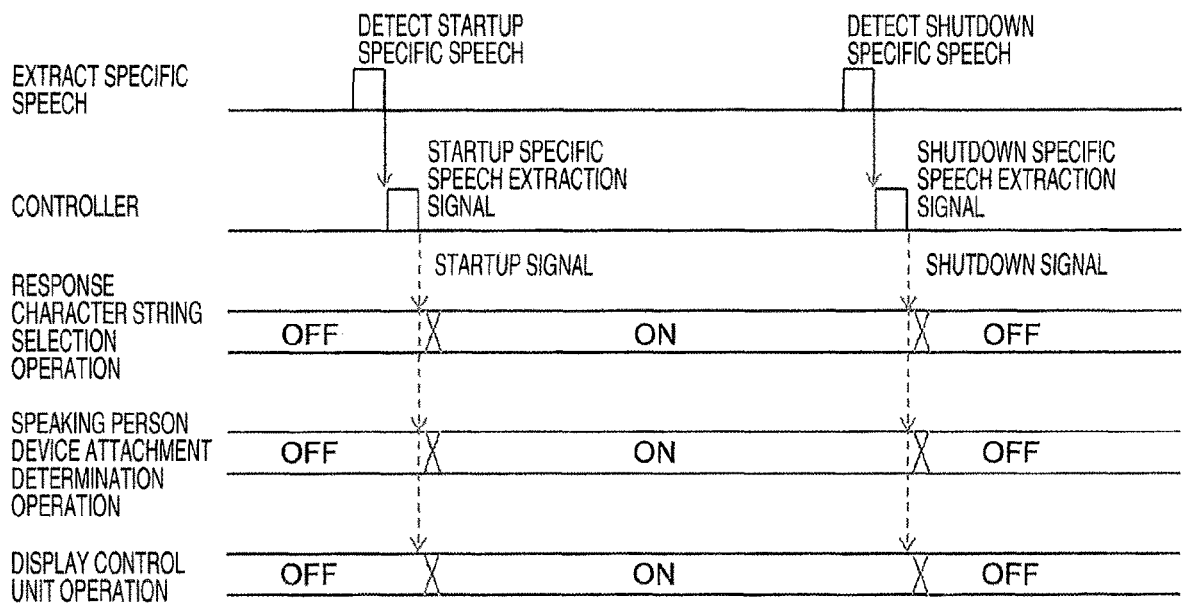
FIG. 7 is a diagram showing an example of a language type information table.
FIG. 8 is a time chart showing the startup and shutdown processing of the translation program.

The second embodiment is an embodiment using a translation program as a the program of the first embodiment. First, a schematic configuration will be described with reference to FIG. 6 and FIG. 7. FIG. 6 is a block diagram showing a functional configuration of a control device (hereinafter referred to as a "translation control device") of a translation program according to the second embodiment. FIG. 7 is a diagram showing an example of a language type information table.

An HMD device 1a according to the second embodiment shown in FIG. 6 is constructed by replacing the application control device 5 of the first embodiment with a translation control device 5a. In addition to the configuration of the application control device 5, the translation control device 5a includes a language type information storage unit 522, a response character string generation unit 610, a response sentence dictionary storage unit 611, an image processing unit 620, and a display control unit 630.

The language type storage unit 522 stores language type information shown in FIG. 7. The language type information defines comprehension ability (input ability) and speech ability (output ability) of the user for each language. Each language is categorized into a language type according to the comprehension ability and the speech ability. The language types include a first language used by the users for everyday conversation, a second language in which the user can understand the characters but of which level of understanding is lower than the first language, a third language of which level of understanding is still more lower than the second language and in which the user cannot understand the characters, a fourth language in which the user can speak but of which speech ability is lower than the first language, and a fifth language of which speech ability is still more lower than the fourth language and in which the user cannot speak. For example, Japanese corresponds to the first language both in terms of the comprehension ability and the speech ability, English corresponds to the second language and the fourth language, and the Chinese corresponds to the third language and the fifth language.

The response character string generation unit 610 selects, from a response sentence dictionary stored in the response sentence dictionary storage unit 611, a response sentence (including both sentences and word units) for the speech character string acquired from the character string generation unit 520, or generates, on the basis of a response sentence dictionary, a response sentence (including both sentences and word units) for the speech character string acquired from the character string generation unit 520.

The image processing unit 620 acquires a captured image of a person with whom the user speaks from the camera 3, generates a speaking person device attachment signal used to determine whether the person with whom the user speaks wears the same HMD device 1 as that worn by the user on the basis of a feature image (barcode or mark) provided in the HMD device in advance, and outputs the speaking person device attachment signal to the controller 540.

The display control unit 630 displays on the display screen 2 the speech character string obtained from the character string generation unit 520 and the response character string obtained from the response character string generation unit 610. There are various display aspects of the response character string, and the response character string may be displayed as it is, or may be displayed using tags similar to those used in the fourth embodiment described later.

FIG. 8 is a time chart illustrating startup and shutdown processing of the translation program. As illustrated in FIG. 8, in the translation control device 5a, the specific speech extraction unit 530 generates a startup specific speech extraction signal in step S06. Then, in step S07, when the controller 540 receives the startup specific speech extraction signal, the controller 540 transmits a startup signal to each block in order to start up the response character string generation unit 610, the image processing unit 620, and the display control unit 630. Then, each block starts up, and with this operation, the HMD device according to the present embodiment can automatically display the character string of the speech spoken by the person with whom the user speaks and display the character string related to the response in accordance with the speech of the user.

When the specific speech extraction unit 530 detects a specific speech for shutdown, the specific speech extraction unit 530 sends a shutdown detection signal to the controller 540 to notify that the specific speech has been detected. Using the sent shutdown detection signal as a trigger, the controller 540 sends a shutdown signal to the character string generation unit 520, the response character string generation unit 610, and the display control unit 630 to shut down each block.

Figure 9:
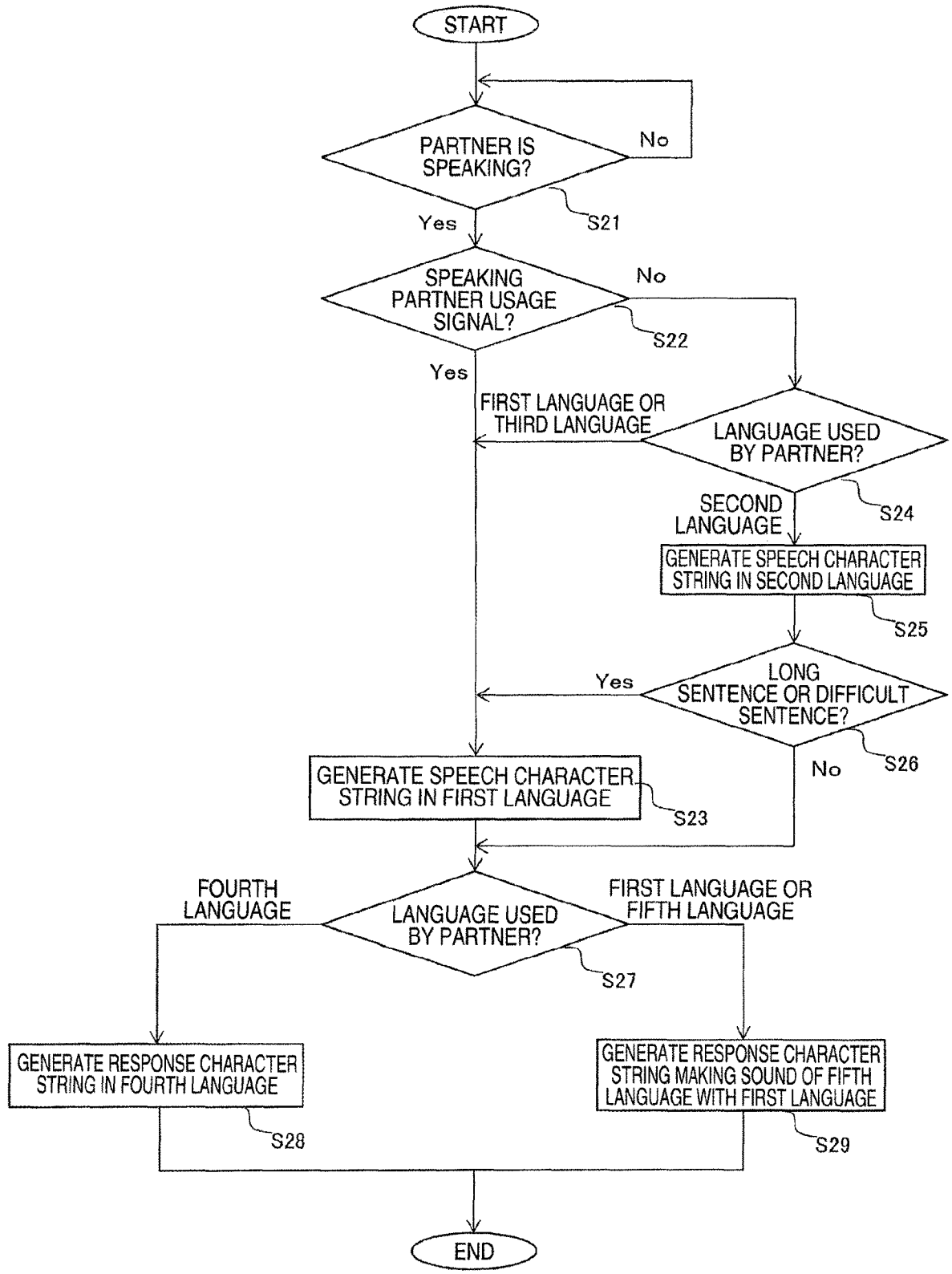
FIG. 9 is a flowchart showing the flow of the processing of the translation program according to the second embodiment.

The flow of the processing of the translation system using the HMD device according to the second embodiment will be explained with reference to FIG. 9. FIG. 9 is a flowchart showing the flow of the processing of the translation program according to the second embodiment. Hereinafter explained is a mode in which only the translation of the speech spoken by the person with whom the user speaks is displayed in a case where the person with whom the user speaks also uses the HMD device. In the following example, the HMD device 1 determines whether or not the person with whom the user speaks is also using the same HMD device, and in a case where the person with whom the user speaks is determined to be using the same HMD device, automatically operation is switched so that the character string generation unit 520 generates a character string in the first language. Startup of the HMD device 1 is also triggered by the extraction of the specific speech. At this occasion, the specific speech extracted by the specific speech extraction unit may be at least one of greetings, names, and voiceprints of the speech spoken in the second language or the third language.

More specifically, after the response character string generation unit 610, the image processing unit 620, and the display control unit 630 are started up in step S10 explained above, the microphone 4 collects speech again and generates sound information. Then, when the speaking person identifying unit 510 determines that it is a dialogue of a speaking person that is different from the user of the HMD device 1a (S21/Yes), the controller 540 determines the presence or absence of the signal using the person with whom the user speaks (S22). When the speaking person is the user (S21/No), the controller 540 waits for speech from the speaking person.

As an example of determination processing of the presence or absence of speaking partner usage signal, for example, there is a method of using a captured image that is output by the camera 3. A bar code or a unique mark is attached to the HMD device 1a in advance. Then, the image processing unit 620 extracts an area in which a barcode or a mark is imaged from the captured image, and performs pattern matching between the extracted area (characteristic image) and the image of the bar code or the mark stored in advance for reference. The image processing unit 620 outputs the result to the controller 540. Based on the pattern matching result, the controller 540 determines whether the person with whom the user speaks is wearing the HMD device. In this case, the signal indicating the result of the pattern matching used by the controller 540 to determine the presence or absence of the HMD device 1*a* corresponds to the speaking partner usage signal.

As another example of determination processing of presence or absence of the speaking partner usage signal, the HMD device 1*a* includes a communication unit 710, such as, for example, inter-communication device based on an RFID (Radio Frequency IDentification) and a detection device, Bluetooth (registered trademark), to be able to receive an ID of each other.

When the controller 540 determines that the person with whom the user speaks are using the same HMD device (S22/Yes), the controller 540 outputs a first language usage signal indicating generation of a speech character string in the first language used in everyday conversation by the user to the character string generation unit 520, and outputs a shutdown signal for shutting down generation operation of the response character string to the response character string generation unit 610.

The character string generation unit 520 and the response character string generation unit 610 generate a speech character string in the first language of the user based on the transmitted signal, and switches an operation so as to shut down generation of the response character string (S23).

When the person with whom the user speaks is not using the same HMD device, the language used by the person with whom the user speaks is determined (S24). In the case of the second language (S24/second language), the character string generation unit 520 generates a speech character string in the second language (S25). In the case of the language other than the second language, i.e., in the case of the first language or the third language (S24/first language or third language), the character string generation unit 520 switches the operation so as to generate a speech character string in the first language of the user (S23).

Furthermore, in a case where the speech of the person with whom the user speaks is longer than a predetermined period of time (in the case of a long sentence) or when the level of difficulty of the used vocabulary is relatively high (S26/Yes), the character string generation unit 520 switches to the first language (S23). In the case where the speech of the person with whom the user speaks is less than the predetermined period of time or the level of difficulty of the used vocabulary is relatively low (S26/No), generation of the speech character string is continued in the second language. The predetermined period of time and words with a high level of difficulty are registered in advance.

The response character string generation unit 610 determines the type of the language used for speech spoken by the person with whom the user speaks. When the type of the language used for speech spoken by the person with whom the user speaks is determined to be the fourth language (S27/fourth language), a response language string is generated in the fourth language and displayed (S28). When the person with whom the speech of the user speaks is the fifth language (S27/fifth language), a response character string making the sound of the fifth language with the first language is generated and displayed (S29). For example, suppose that the first language of the user is Japanese, the fourth language is English, and the fifth language is Chinese. In this case, when a speech is spoken in English of the person with whom the user speaks, a response character string is generated in English, and when a speech is spoken in Chinese of the person with whom the user speaks, a character string related to a response in Chinese is generated in katakana (Japanese syllabary characters) or romaji (Roman characters).

According to the present embodiment, after the translation program is started up, the type of the language used for the speech character string and the response character string, i.e., the operation mode, can be set or changed depending on the speech of the person with whom the user speaks and whether the HMD device of the person with whom the user speaks arrives or not. At this occasion, since the user of the HMD device does not need to perform an operation input for setting or changing the operation mode, the operability of the HMD device is expected to be improved.

In the above case, there is only a one person with whom the user speaks, and the speech character string is generated and displayed in the second language or the first language, but in a case where the speaking person identifying unit 510 detects multiple persons with whom the user speaks, and the character string generation unit 520 determines that speech is spoke in multiple languages, the speech character string may be generated in the first language regardless of the above processing.

In the above case, whether there is a speaking partner usage signal or not is determined in step S22, but this step is not necessary. In this case, in step S22, the character string generation unit 520 may determine whether the person with whom the user speaks is speaking in the first language.

The HMD device 1 according to the present embodiment operates to automatically register, in an interactive format with the user, user sound information to be stored in the user sound information storage unit. Therefore, the controller 540 detects that the user is using the HMD device 1 for the first time from speech information of the user obtained from the microphone 4 and preregistered information stored inside of the user sound information storage unit 511. When the controller 540 detects that the user is using the HMD device 1 for the first time, the controller 540 controls each block so as to perform an operation unique to the initial registration.

More specifically, first, the controller 540 controls the character string generation unit 520 to output, in a plurality of languages, an appropriate numerical value and an instruction character string to read the numerical value in the mother tongue. As a result, the mother tongue of the user is determined.

Subsequently, using the determined language, control is performed to output the instruction character string to allow the user to select the first language and multiple options. At this time, the character string generation unit 520 attaches numbers to options so that the user can answer with a numerical value, and outputs a character string for instructing the user to answer with a numerical value. As a result, the first language of the user is determined. Hereinafter, the second language, the third language, the fourth language, and the fifth language are determined in the same manner.

Subsequently, the controller 540 registers specific speech information for performing automatic startup. Therefore, the controller 540 controls the character string generation unit 520 to output, in the second language and the fourth language, a character string related to a predetermined greeting and a character string to read the predetermined greeting. Likewise, a specific speech is registered to perform automatic shutdown. Person names or mnemonic names other than the first language of the user may be added to the character string related to greeting.

In order to measure the proficiency of the second language and the fourth language of the user, the controller 540 displays a word, a short sentence, and a long sentence on the display screen 2 to check the comprehension level. In this case, the user may be instructed to read the display character string in the first language, but the comprehension level can be set in a shorter period of time when letting the user to decide whether the user is understanding or not and setting the comprehension level based on the speech of "yes", "no" spoken by the user, or setting the comprehension level in accordance with a time to receive the response speech.

In order to determine the character size suitable for user, the character string generation unit 520 displays a character string indicating that the standard character size is set, and a characters string used to determine the character size, and a speech method for determining the character size, and the character used for the determination is increased from the minimum size, and the standard character size is determined by detecting the character size determination speech of the user.

In the present embodiment, although the response character string generation unit 610 generates a response character string based on the character string converted by the character string generation unit 520, the same effect can be obtained by causing the response character string generation unit 610 to generate a response character string based on sound information obtained from the microphone 4.

Further, in the present embodiment, preregistered information such as language type and sound identification information is registered by each HMD device, but the present invention is not limited thereto. For example, preregistered information once performed may be stored in a data storage device such as a server via a communication device by associating it with the user's ID. In this case, if preregistered with one of the HMD devices, preregistered information is retrieved from the server and downloaded even if the usage of other HMD head-mounted display devices is used for the first time, so that it is not perform preregistration. In order to limit the searchable range of the preregistered information, the IDs of the user may be grouped.

In the present embodiment, the character string generation unit 520 is configured to operate to generate a character string based on the speech spoken by the person with whom the user speaks, but the present invention is not limited thereto. For example, in a case where the user inputs a specific speech and words to be converted to the first language into the microphone, the words may be displayed in the first language, or in a case where the user inputs a specific speech and the words and language to be converted from the first language, the words may be displayed in that language.

When character string generation unit 520 displays a speech character string, the translation sentence of all the sentences in first language may be displayed according to the level of difficulty, or the translation for each word may be displayed.

The above series of operations regarding the initial setting may be performed as follows: based on sound information and sound identification information, the speaking person identifying unit 510 determines that the person who speaks sound information is not registered as the user, the character string generation unit 520 generates a setting character string used for the initial setting, the display control unit 630 displays the setting character string on the display screen 2, and the controller 540 performs the operations based on the sound information which the user speaks in response to the setting character string. The series of operations related to the initial setting mentioned here also includes registration of a specific speech.

The "setting character string used for the initial setting" is a character string asking the first language that user is good at everyday conversation, the second language in which the user can understand characters, and the third language in which the user cannot understand characters, a character string in a question format for asking the fourth language in which the user can speak and the fifth language in which the user cannot speak, or a character string representing greetings words and persons' names in multiple languages and a character string prompting the user to speak the character string. The character string in the question format is a question sentence that can be answered with yes or no, or a question sentence that can be answered with a number upon attaching the number to the beginning of each character string.

Third Embodiment

Figure 10:
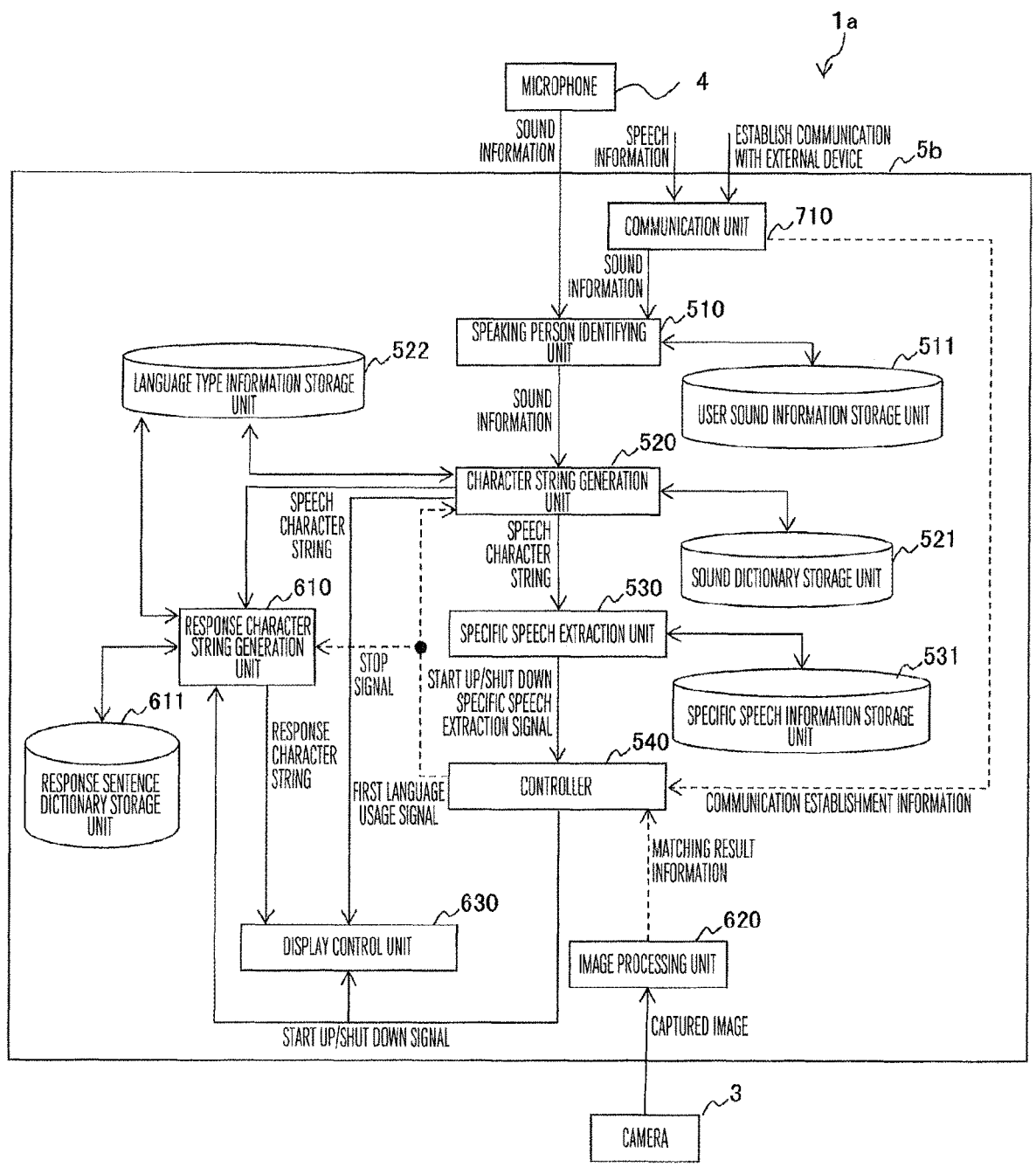
FIG. 10 is a hardware configuration diagram showing the HMD device according to a third embodiment.

The third embodiment explains an example of an HMD device which acquires the speech spoken by the person with whom the user speaks via a communication device. FIG. 10 is an example of a hardware configuration diagram showing the HMD device according to the third embodiment. An HMD device 1b of FIG. 10 is different in that the HMD device 1b obtains speech information via a communication unit 710. The communication unit 710 converts the speech information spoken by the person with whom the user speaks from a specific format into sound information, and outputs the converted sound information to the speaking person identifying unit 510.

In this case, both of the head-mounted display devices add the device IDs to the communication format of the communication unit 710, so that the controller 540 can determine whether the person with whom the user speaks is using the same head-mounted display or not.

In the case where the communication unit 710 inputs speech information spoken by the person with whom the user speaks in the format corresponding to character string, and converts the speech information into the character string information, the character string generation unit 520 outputs the character string information converted by the communication unit 710 as it is for the information sent from the communication unit 710 or simplifies and outputs the character string information.

Likewise, for the information sent from the communication unit 710, the response character string generation unit 610 generates a response character string for the character string information converted by the communication unit 710, and sends the generated character string to the display screen 2.

Fourth Embodiment

In general, one of the major characteristics of an HMD device is that a character string, an image, and a figure can be displayed in a superimposed manner on a landscape in front of the user. For this reason, if the area for displaying characters, images, and figures is large, the front landscape will be difficult to see. It is possible to allow the user to feel an illusion that characters, images, and figures to be displayed are displayed as if being displayed a few meters ahead by making a virtual image, but even in that case the display area is limited. In a case where a user has a conversation with another person in a language other than the language used in everyday life, it would be easy for the user to use the device and the conversation will be smooth when the character information to be seen at once for the translation sentence and the response recommendation sentence are reduced to the minimum.

Figure 11:
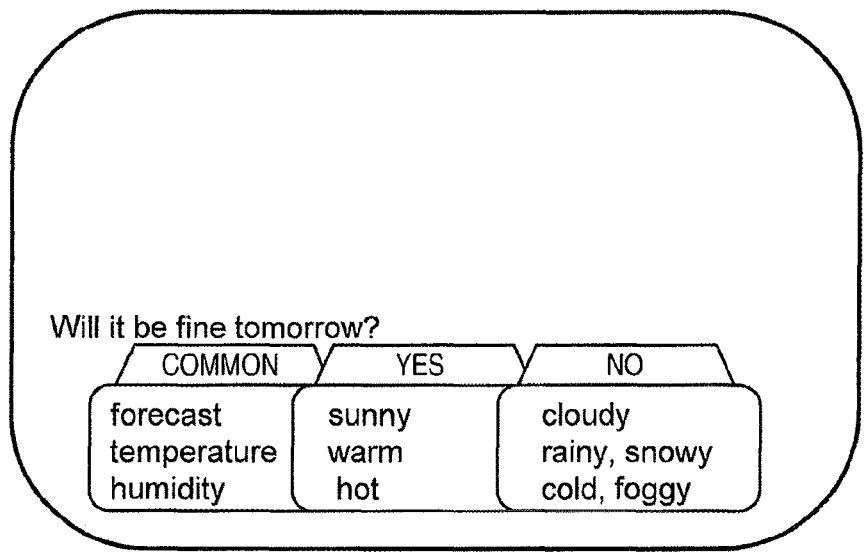
FIG. 11 is a diagram showing an example in which response character strings of three categories of common, affirmative, and negative are displayed as tags.
Figure 12:
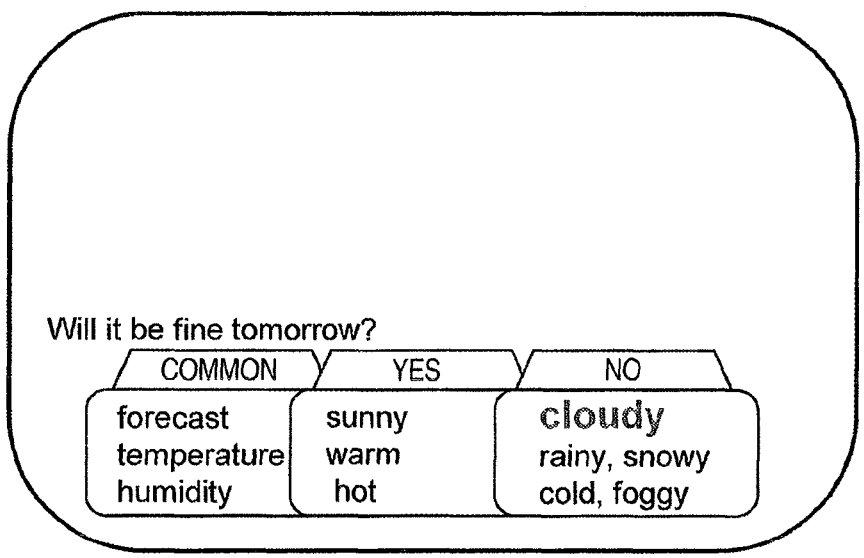
FIG. 12 is a diagram showing an example in which the display form of the response sentence spoken by a user in the example of FIG. 11 is changed.
Figure 13:
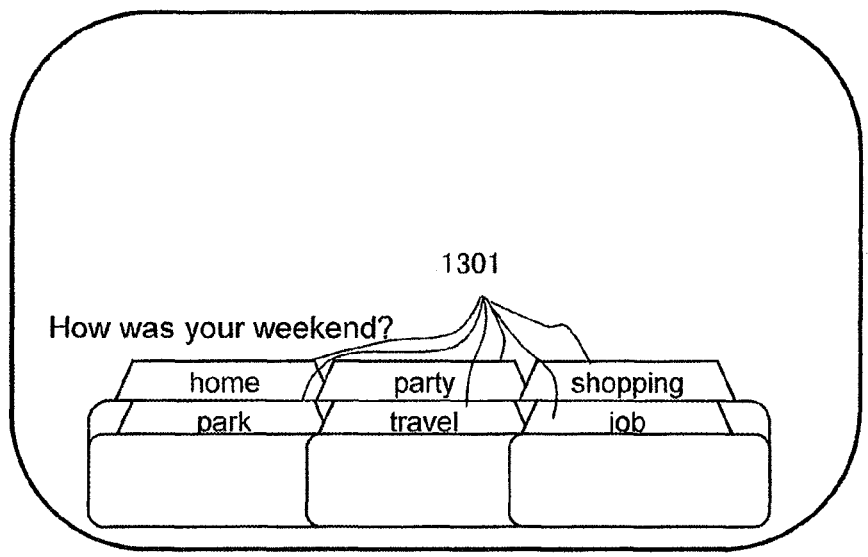
FIG. 13 is a diagram showing an example of display in which only items of the tags are displayed.
Figure 14:
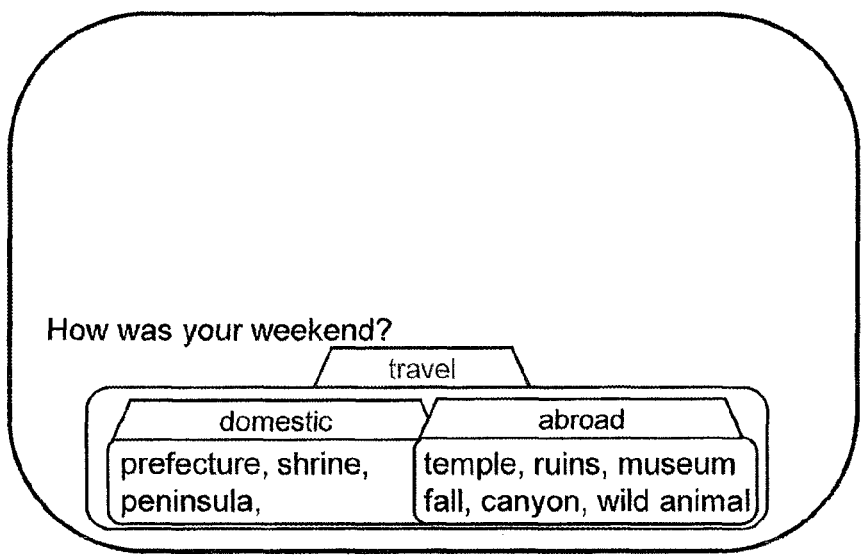
FIG. 14 is a diagram showing an example in which response character strings are hierarchically displayed with tags.
Figure 15:
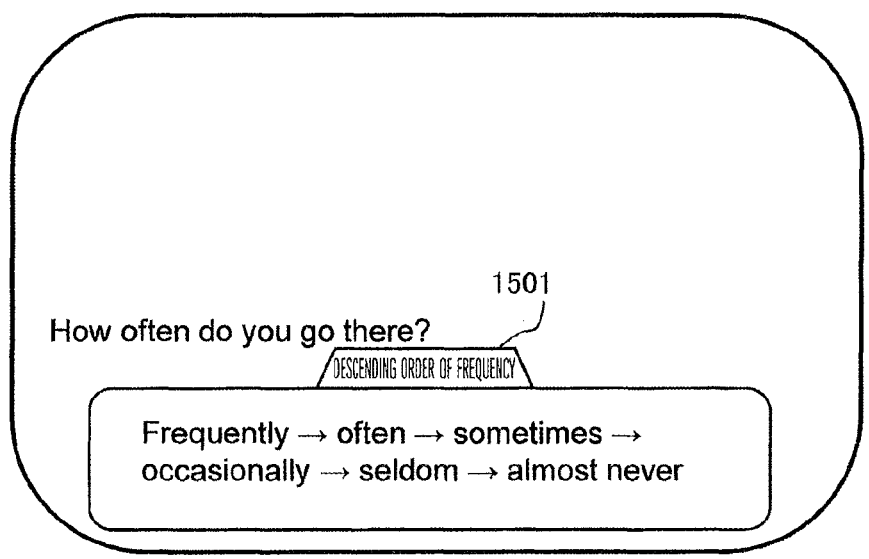
FIG. 15 is a diagram showing an example in which response character strings are displayed in order according to certain criteria.

In the present embodiment, an example of an HMD device for efficiently displaying, with less character strings, the character string and the response character string related to the person with whom the user speaks speech will be explained. The relationship between each block and block is the same as the first embodiment, and so the relationship will not be explained. Hereinafter, a character string generation method in the character string generation unit 520 and the response character string generation unit 610 which is the characteristic operation of the HMD device according to the present embodiment, and the display form of the display screen 2 will be explained with reference to FIG. 11 to FIG. 15. FIG. 11 is a diagram showing an example in which response character strings of three categories of common, affirmative, and negative are displayed with tags. FIG. 12 is a diagram showing an example of a change in the display form of the response sentence that the user speaks in the example of FIG. 11. FIG. 13 is a diagram showing a display example in which only items of the tag are displayed. FIG. 14 is a diagram showing an example in which the response character strings are hierarchically displayed with tags. FIG. 15 is a diagram showing an example in which the response character strings are displayed in order along certain criteria.

First, the character string generation unit 520 generates a character string so as to reduce the number of characters of the display character string. For this reason, for the speech contents of the person with whom the user speaks, character strings are generated by omitting honorific expressions such as polite language, humble language, respected word, and the like. Honorific names before and after the name are omitted. Further, subjects, verbs, and nouns are preferred, and adjectives and adverbs are omitted or displayed with small characters. The character string generation unit 520 converts sound information into speech character string, then performs part-of-speech decomposition processing, syntax analysis processing, and generates a character string in which honorific expression is omitted.

The response character string generation unit 610 selects a plurality of keywords related to the speech contents of the person with whom the user speaks from the database, categorizes the selected keywords by a predetermined method, and displays each of the categorized keywords upon dividing them into areas attached with category tags. Alternatively, the keywords are arranged and displayed in order based on a predetermined index.

For example, in a case where a response is made with "Yes/No", keywords related to the case where the response is "Yes" and the case where the response is "No" and keywords common to both of them are selected from a database (response sentence dictionary), and the selected keyword is output to the display screen 2 so that the selected keyword as well as tags "Yes", "No", and "Common" are displayed in individual areas (see FIG. 11).

When the user uses a keyword from options, the color of the used keyword (Cloudy in FIG. 11) is changed and displayed as shown in FIG. 12 in order to notify the user that the head-mounted display recognizes that the keyword is used, and thereafter, the speech content spoken by the person with whom the user speaks and keywords related to the keyword used by the user are searched from the database.

When the selection of the keyword is completed, the already displayed character strings and the tags are hidden, and the newly searched keywords are displayed according to the above method. In this case, the method of emphasizing the selected keyword may be bold characters or increasing the character size, or delaying the timing of hiding the display by a predetermined time from other keywords. The procedure of hiding the already displayed character strings and hiding the tags may be such that a character string or a category having a lower degree of relationship with the selected keyword may be erased first. Further, the character strings of the tags may be displayed in the first language.

In a case where a selection range of keywords is wide, e.g., responding to an abstract question such as "how was it?", abstract keywords to more concrete keywords may be displayed in a stepwise manner. As shown in, for example, FIG. 13, the following procedure may be used: when only a large number of tags 1301 are displayed and the user speaks a character string displayed as a tag, the character string of the tag used is displayed in such a manner that the color of the character string is changed as shown in FIG. 14, and the other tags are hidden, and the speech content spoken by the person with whom the user speaks and keywords related to the tag used by the user are searched and displayed from the database. At this time, keywords and tags of different levels in the hierarchy may have different display area colors, or the colors of the characters may be changed. Keywords having a level of difficulty equal to or higher than that of the user may be preferentially displayed based on the above-described comprehension level data of the initial setting. In this case, the response character string generation unit 610 initially searches the database for keywords related to the speech content spoken by the person with whom the user speaks, and while the user is responding, keywords related to the speech content spoken by the person with whom the user speaks and the speech content of the user are searched from a database (response sentence dictionary) with a regular interval.

Further, in a case of answering the degree, e.g., "how frequently?", a display rule is displayed in a tag 1501 as shown in FIG. 15, and keywords are arranged in the order of the rule. Point information may be attached to the used keyword, and the order of preference for display may be determined in accordance with the attached point.

Various display forms explained above are achieved by causing the response character string generation unit 610 to extract required words from the response sentence dictionary and select the type of the tag, words listed in a tag, and a type of response sentence, and the display control unit 630 to execute processing of changing of display color, arrangement display, and arranging the response sentences in the tag.

Each of the above-described embodiments does not limit the present invention, and various modifications are possible within the scope not deviating from the gist of the present invention, and these are also within the technical scope of the present invention.

For example, in the above example, a speech character string and a response character string are displayed using tags, but figures and videos (dynamic images) may be displayed. The HMD device 1 may have a speaker for outputting a response character string as sound. More particularly, in the case of the fifth language, even if the user speaks, this may not be conveyed to the person with whom the user speaks. In this case, the user may speak the selection result of the response character string and output the selected response character string from the speaker as sound.

REFERENCE SIGNS LIST

1 HAD device
2 display screen
3 camera
4 microphone
5 application control device

The invention claimed is:

1. A head-mounted display system that improves a user's operability, comprising:
 a microphone for receiving an input of speech of a speaking person and outputting sound information;
 a processor;
 at least one memory that stores a translation program which is started up based on specific speech, specific speech information for identifying the specific speech, a sound dictionary prepared for a plurality of languages, a response sentence dictionary prepared for a plurality of languages, and language type information which indicates a correspondence relation between each language and comprehension ability and speech ability of the user for each language;
 a display screen to be viewed by the user;
 an interface that connects the processor, the at least one memory and the display screen;
 the processor is configured to:
 convert the sound information into a character string and generate a speech character string by referring to the sound dictionary corresponding to one of a plurality of languages;
 extract the specific speech included in the speech character string by referring to the specific speech information, and generating a specific speech extraction signal indicating an extraction result thereof;
 start up the translation program by referring to the specific speech extraction signal;
 once the translation program starts up, select or generate a response character string for responding to the speech character string by referring to the response sentence dictionary corresponding to one of a plurality of languages;
 display the response character string on the display screen; and
 wherein the processor:
 selects one of a plurality of languages in accordance with the comprehension ability of the user for each language by referring to the language type information, and generates the speech character string by referring to the sound dictionary corresponding to the selected language, and
 selects one of the plurality of languages in accordance with speech ability of the user for each language by referring to the language type information, and generates the response character string by referring to the response sentence dictionary corresponding to the selected language.

2. The head-mounted display system according to claim 1, the processor further configured to:
 store, in the memory, sound identification information spoken by the user in advance in order to identify the user of the head-mounted display system; and
 determine whether the speaking person is the user or not on the basis of consistency between sound information that is output from the microphone and the sound identification information,
 wherein in a case where the speaking person is determined to be the user, the processor starts up or shuts down the program.

3. The head-mounted display system according to claim 1, the processor further configured to:
 store, in the memory, startup rule information defining a level of priority when the program is started up,
 wherein when the processor obtains the specific speech extraction signal, and the startup rule information permits starting up the program in accordance with the specific speech extraction signal, the program is started up.

4. The head-mounted display system according to claim 1, wherein
 the plurality of languages include a first language used by the user in everyday conversation, a second language in which the user can understand characters but of which level of understanding is lower than the first language, and a third language of which level of understanding is still more lower than the second language and in which the user cannot understand characters, and
 the specific speech extracted by the processor is at least one of a greeting, a name, and a speech voiceprint spoken by the user in the second language or the third language.

5. The head-mounted display system according to claim 4, wherein
 the plurality of languages include a fourth language in which the user can speak but of which speech ability is lower than the first language and a fifth language of which speech ability is still more lower than the fourth language and in which the user cannot speak,
 on a condition that the processor determines that the sound information is spoken by a person with whom the user speaks, who is a speaking person different from the user, the processor:
 generates the speech character string using the second language when the sound information is determined to be in the second language,
 generates the speech character string using the first language when the sound information is determined to be in the first language or the third language,
 generates the response character string using the fourth language when the sound information is determined to be in the fourth language, and
 generates, in katakana (Japanese syllabary characters) or romaji (Roman characters), a response character string corresponding to a pronunciation of a response speech in the fifth language when the sound information is determined to be in the fifth language.

6. The head-mounted display system according to claim 5, wherein
 the sound information is determined to be in the second language, the processor changes the language constituting the speech character string from the second language to the first language in accordance with a length of a speech spoken by the person with whom the user speaks or the level of difficulty of a work in a speech.

7. The head-mounted display system according to claim 5, wherein
 when the processor obtains a plurality of pieces of sound information which are in different languages, the processor generates the speech character string using the first language for each of the pieces of sound information.

8. The head-mounted display system according to claim 1, comprising:
- a camera for capturing an image of a surrounding environment around the user and generating a captured image; and
- the processor for detecting a characteristic image indicating that another head-mounted display device of the same type as the head-mounted display device worn by the user is imaged in the captured image,
- in a case where the characteristic image is detected, the processor outputs a first language usage signal to generate the speech character string in the first language which the user uses in everyday conversation, and outputs a shutdown signal to shut down the generation operation of the response character string.

9. The head-mounted display system according to claim 1, further comprising a communication interface communicatively connects to an external device,
- wherein in a case where the communication interface establishes a communication with another head-mounted display device of the same type as the head-mounted display device worn by the user, the processor outputs a first language usage signal to generate the speech character string in the first language which the user uses in everyday conversation, and outputs a shutdown signal to shut down the generation operation of the response character string.

10. The head-mounted display system according to claim 2, further comprising:
- the processor for performing control of displaying a display screen placed in front of the user and the response character string on the display screen,
- wherein in a case where the processor determines that, on the basis of the sound information and the sound identification information, a person who speaks the sound information is a person that is not registered as the user, the processor generates a setting character string used for initial setting, displays the setting character string on the display screen, and the processor performs initial setting registration on the basis of sound information spoken by the user in response to the setting character string.

11. The head-mounted display system according to claim 1, wherein
- the processor generates the speech character string with basic words that do not include any honorific word and title.

12. The head-mounted display system according to claim 1, wherein
- the processor displays, via the display screen, the speech character string in which an adjective and an adverb are omitted, or displays the speech character string in such a manner that a size of characters constituting an adjective and an adverb is smaller than a standard character size.

13. An operating method for a head-mounted display device, that improves a user's operability, comprising:
- connecting a processor, at least one memory and a display screen, via an interface;
- receiving an input of speech of a speaking person and outputting sound information;
- storing a translation program which is started up based on specific speech, specific speech information for identifying the specific speech, a sound dictionary prepared for a plurality of languages, a response sentence dictionary prepared for a plurality of languages, and language type information which indicates a correspondence relation between each language and comprehension ability and speech ability of the user for each language;
- converting the sound information into a character string and generating a speech character string by referring to the sound dictionary corresponding to one of a plurality of languages;
- extracting the specific speech included in the speech character string by referring to specific speech information and generating a specific speech extraction signal indicating an extraction result thereof;
- starting up the translation program by referring to the specific speech extraction signal;
- once the translation program starts up, selecting or generating a response character string for responding to the speech character string by referring to the response sentence dictionary corresponding to one of a plurality of languages;
- displaying the response character string on the display screen; and
- wherein the processor:
  - selects one of a plurality of languages in accordance with comprehension ability of the user for each language, and generates the speech character string by referring to the sound dictionary corresponding to the selected language, and
  - selects one of the plurality of languages in accordance with speech ability of the user for each language by referring to the language type information, and generates the response character string using by referring to the response sentence dictionary corresponding to the selected language.

14. The head-mounted display system according to claim 1, wherein
- the comprehension ability of the user for each language type are determined based on at least one of the level of difficulty of the used vocabulary contained in the speech of the user and the speech length, and
- the speech ability of the user for each language type are determined based on at least one of the level of difficulty of the used vocabulary contained in the speech of the user and the speech length.

15. A head-mounted display system that improves a user's operability, comprising:
- a microphone for receiving an input of speech of a speaking person and outputting sound information;
- a processor;
- at least one memory;
- a display screen;
- an interface that connects the processor, the at least one memory and the display screen;
- the processor is configured to:
- convert the sound information into a character string and generating a speech character string;
- store specific speech information in the at least one memory, in which at least one of a program and an operation mode, which is to be started up or shut down, is associated with a specific speech for starting up or shutting down the program and the operation mode;
- extract the specific speech included in the speech character string by referring to the specific speech information, and generating a specific speech extraction signal indicating an extraction result thereof;
- start up or shut down the program or the operation mode by referring to the specific speech extraction signal;
- store, via the memory, a conversation dictionary constituting a conversation sentence;

store, via the memory, language type information which represents a correspondence relation among language types, and information concerning comprehension ability and information concerning speech ability of the user for each language;

select or generate a response character string corresponding to the speech character string by referring to the conversation dictionary;

perform control of displaying the display screen placed in front of the user and the response character string on the display screen; and wherein the processor:
- selects one of a plurality of languages in accordance with the comprehension ability of the user for each language, and generates the speech character string using the selected language, and
- selects one of the plurality of languages in accordance with speech ability of the user for each language among the plurality of languages, and generates the response character string using the selected language, wherein the plurality of languages include a first language used by the user in everyday conversation, a second language in which the user can understand characters but of which level of understanding is lower than the first language, and a third language of which level of understanding is still more lower than the second language and in which the user cannot understand characters, wherein the specific speech extracted by the processor is at least one of a greeting, a name, and a speech voiceprint spoken by the user in the second language or the third language, and wherein when the sound information is determined to be in the second language, the processor changes the language constituting the speech character string from the second language to the first language in accordance with a length of a speech spoken by the person with whom the user speaks or the level of difficulty of a work in a speech.

* * * * *